Oct. 7, 1941.  F. L. MOSELEY  2,257,757
RADIO COMPASS NAVIGATION APPARATUS
Filed Oct. 22, 1937  4 Sheets-Sheet 3
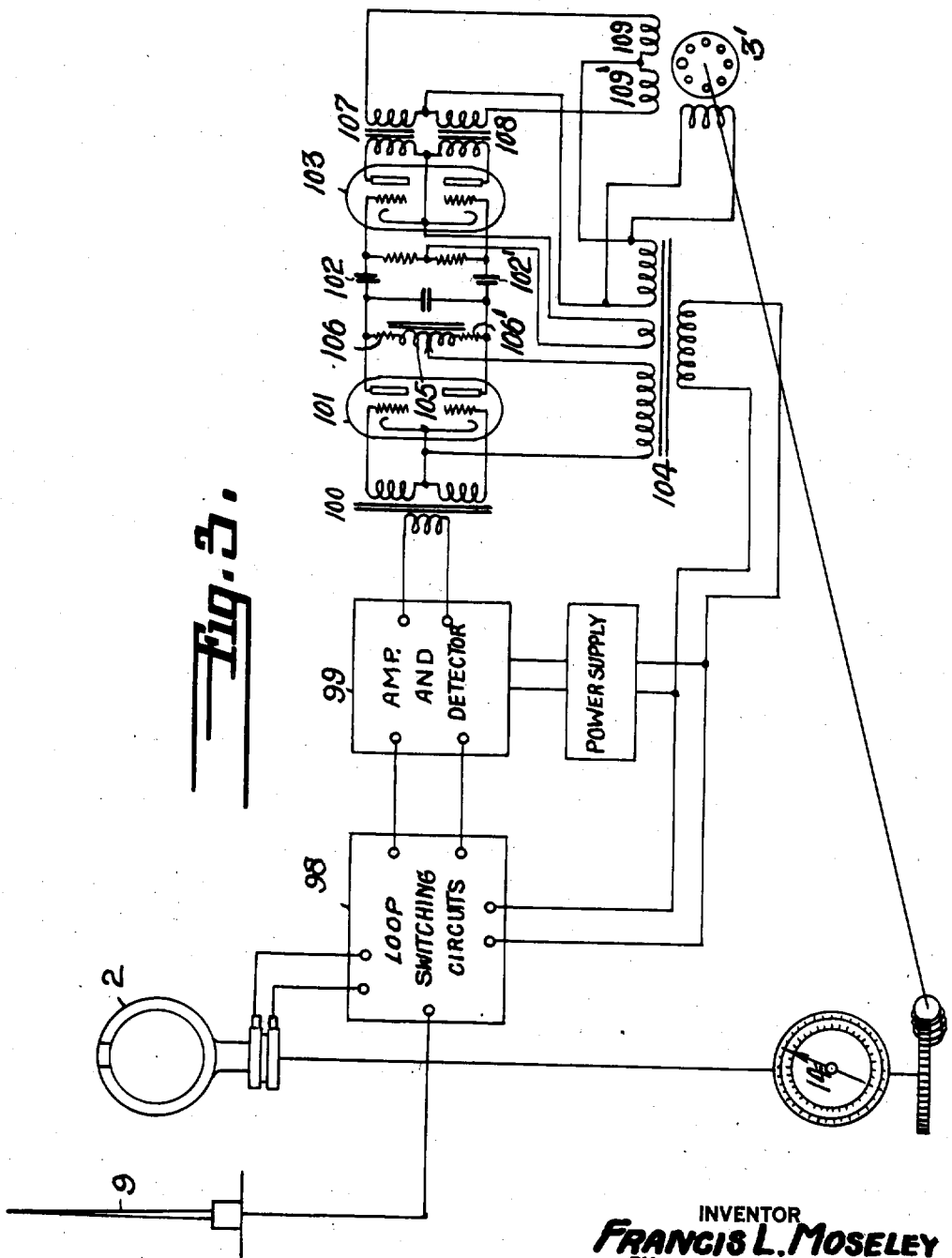
INVENTOR
FRANCIS L. MOSELEY
BY
Herbert H. Thompson
HIS ATTORNEY.

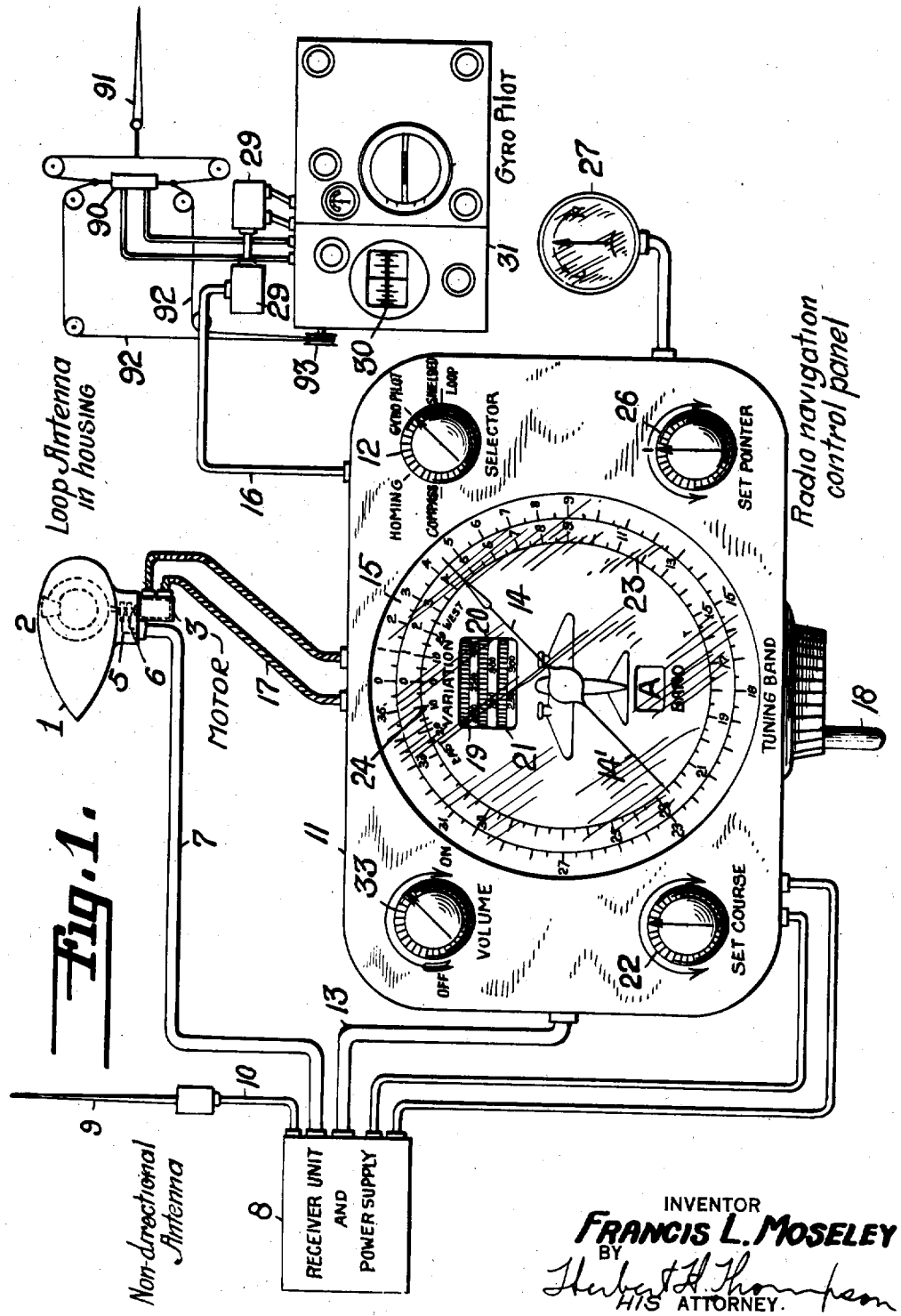

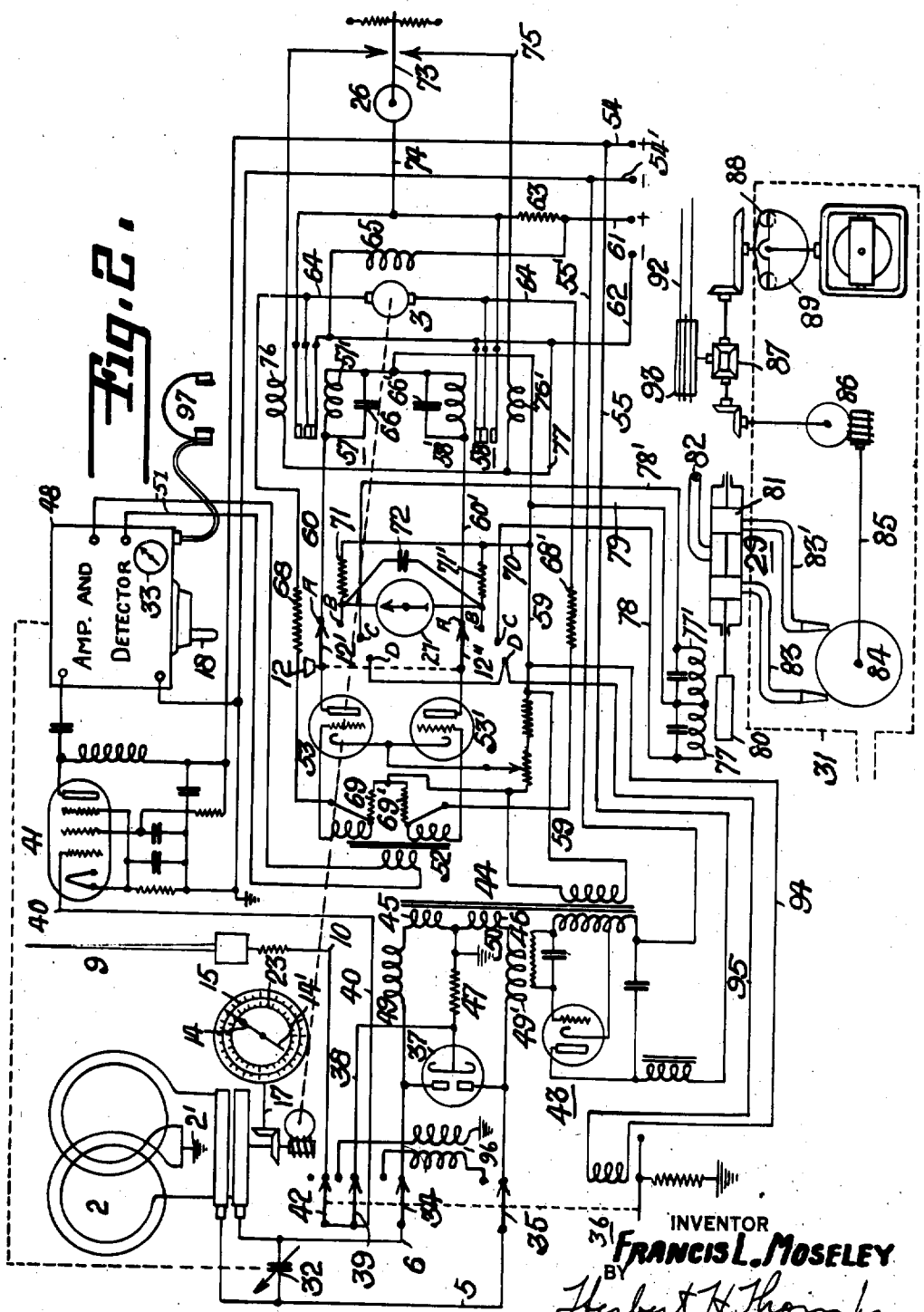

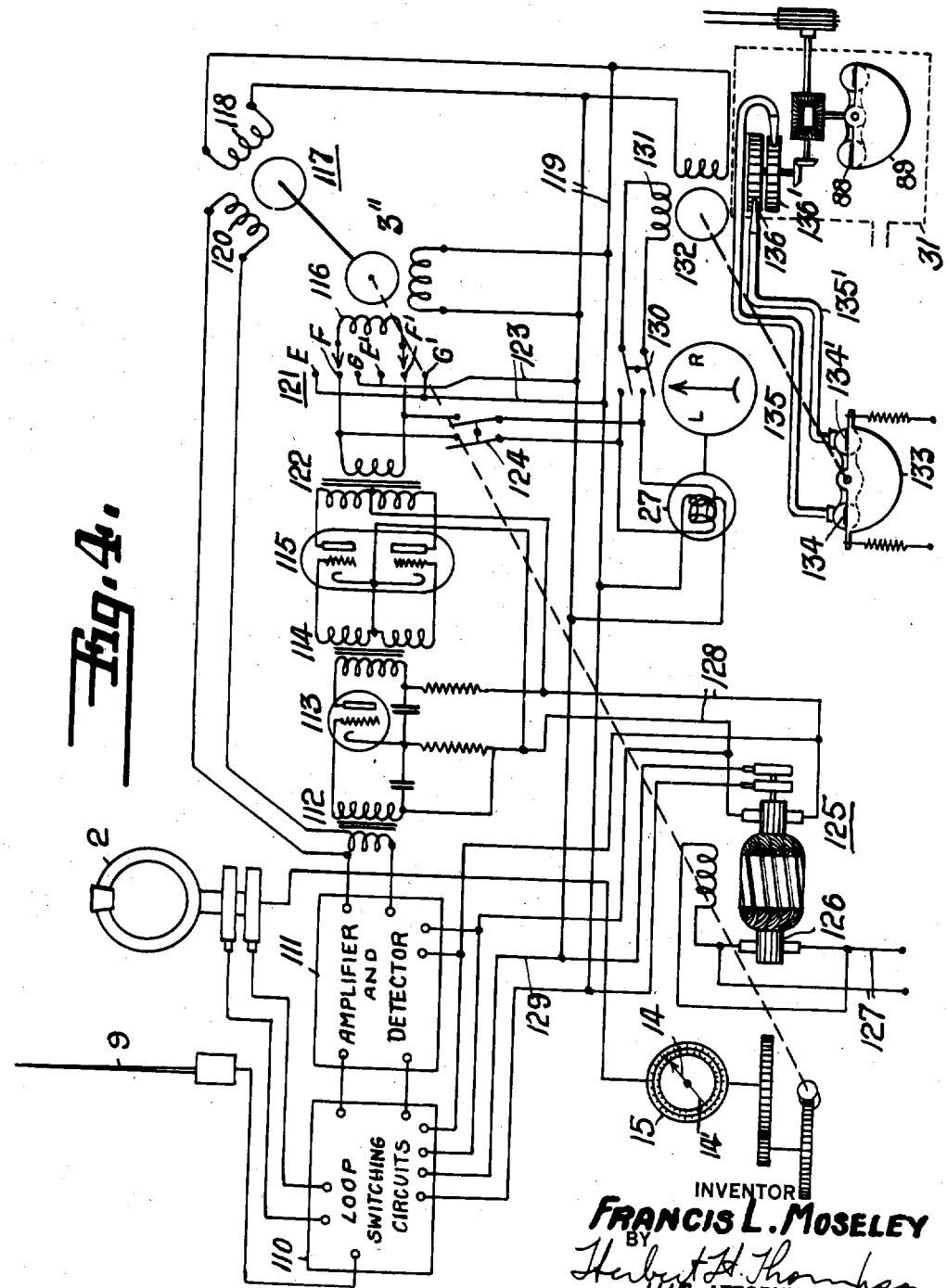

Patented Oct. 7, 1941

2,257,757

UNITED STATES PATENT OFFICE 2,257,757

RADIO COMPASS NAVIGATION APPARATUS

Francis L. Moseley, Yonkers, N. Y., assignor to Sperry Gyroscope Company, Inc., Brooklyn, N. Y., a corporation of New York Application October 22, 1937, Serial No. 170,308

16 Claims. (Cl. 250—11)

This invention relates, generally, to bearing or location indicating navigation apparatus, and the invention has reference, more particularly, to a novel continuously operable, automatic orienting, radio compass navigation and control apparatus for use in the navigation of air, sea or land craft.

Heretofore, radio compasses have been used to some extent as aids to navigation. The early compasses employed loop antennae because of their marked directional signal characteristics. If such a loop is mounted in a vertical plane for rotation about a vertical axis, it produces a maximum signal pick-up output when the plane of the loop extends in the direction of the transmitting station, the pick-up output being a minimum or null when the plane of the loop is at right angles to the direction of the station, i. e., when the loop plane is aligned with the incoming signal wave front.

The more recent types of radio compasses employ a non-directional antenna in conjunction with the loop antenna, the signal output of the non-directional antenna being combined with the loop signal by use of special switching and amplifying circuits so that a zero-center or right-left meter may be operated therefrom. By use of such a meter the position of a station or stations can be ascertained and in navigation the radio compass became valuable since a direct "homing" course could be steered to the transmitting station, the pilot correcting the ship's rudder in accordance with the indications of the right-left meter.

These radio compasses heretofore used, however, required considerable skill, attention and care on the part of the operator in use, and in addition much time was consumed when it was desired to take bearings on a number of stations, as for determining position, and furthermore these compasses generally were of uncertain utility owing to the 180 degree ambiguity obtaining with most of them.

The principal object of the present invention is to provide navigation apparatus employing a novel automatic orientating radio compass giving continuous bearings throughout 360°, a continuously operating servo system being provided to drive the radio loop so as to maintain the same automatically in the null position with respect to the incoming signal, 180 degree ambiguity being eliminated in the compass of this invention.

Another object of the present invention lies in the provision of a novel navigation apparatus employing a radio compass having easily operable means for directly indicating either magnetic or true bearings of the craft or of the transmitting station or stations.

Still another object of the present invention is to provide novel radio compass navigation apparatus adapted for enabling the pilot to manually steer a homing course, while correcting for side wind, if desired.

A further object of the present invention lies in the provision of a novel radio compass navigation apparatus employing directional signals for controlling the base line of the azimuth gyro of an automatic pilot, whereby the craft is steered automatically to a desired destination.

Still another object of the present invention is to provide novel radio compass navigation apparatus of the above character having means for rotating a loop to a position of maximum signal for aural reception, with the non-directional antenna disconnected, in which position the receiver input is shielded from electrostatic induction and receives only electromagnetic waves.

Other objects and advantages will become apparent from the specification, taken in connection with the accompanying drawings wherein the invention is embodied in concrete form.

In the drawings:

Fig. 1 is a schematic view of the novel automatic orientating radio compass navigation apparatus of this invention.

Fig. 2 is a wiring diagram of the apparatus of Fig. 1.

Fig. 3 is a wiring diagram of a somewhat modified arrangement.

Fig. 4 is a wiring diagram of an additional somewhat modified arrangement.

Similar characters of reference are used in all of the above figures to indicate corresponding parts.

Referring now to Fig. 1 of the drawings, the reference numeral 1 designates a streamlined housing containing an electrostatically shielded loop 2 that is adapted to be rotated within housing 1 by a motor 3. Loop 2 is connected through leads 5 and 6 of cable 7 to a radio receiver and power supply unit 8 for feeding a directional signal voltage to this receiver. A non-directional antenna 9 is connected through lead 10 for also supplying a non-directional signal voltage to receiver 8. Receiver 8 operates in a conventional manner, as will further appear, to produce right or left voltage signals as loop 2 is turned to the right or left with respect to an incoming radio signal wave front.

These right-left or directional signals are fed through cable 13 to a control panel 11 having a radio compass pointer 14 movable over a compass scale 15. A selector switch knob 12 is mounted on panel 11 and may be turned to connect these right-left or directional signals to any of several devices which are operated therefrom. When the compass is to be operated in automatic orientation, switch knob 12 is turned to the position marked "compass," thereby connecting the directional signals to motor control circuits contained in receiver 8, which circuits by operating either electric, electro-pneumatic or electronic relays, serve to control the reversible loop drive motor 3. The motor 3 is thus caused to drive the loop 2 into alignment with the incoming signal wave front, while simultaneously turning compass pointer 14 through the flexible shaft connection 17, whereby pointer 14 moves over stationary scale 15 to thereby indicate the bearing of the transmitting station with respect to some fixed line at the receiving station, for example the fore and aft axis of the craft carrying the receiving equipment. Thus, the fore and aft axis or reference line of the craft, such as an airplane, may extend through or parallel to the zero and 180° points of scale 15. As the heading of the craft starts to change, causing the loop to turn with respect to the incoming signal wave front, the automatic servo mechanism is brought into play for operating motor 3 to turn the loop 2 to maintain the plane of the same at right angles to the signal direction and to cause pointer 14 to continuously indicate the bearing of the station with respect to the craft's fore and aft axis. Thus, the pilot or navigator of the craft has continuously available the station bearing without attention on his part other than initially tuning in the station by use of tuning knob 18 connected for selectively turning the tuning scales 19, 20 and 21, corresponding to the three wave bands commonly used, especially on aircraft.

Positioned concentric with respect to fixed compass scale 15 and inwardly thereof is a rotatable compass scale 23 that is connected to be turned by a "set course" knob 22. The scale 23 is adapted to be turned so that the same repeats the reading of the craft's compass or directional gyroscope as described in Patent No. 1,715,270. Scale 23 is used when it is desired to obtain the magnetic bearing of the transmitting station or the magnetic bearing of the craft from the station. i. e., reversed bearings. To accomplish the manual setting of this scale, the pilot or navigator first observes his compass course, as by use of the craft's compass or directional gyroscope 30. He then turns the knob 22 until this course indicated on scale 23 is opposite the fixed zero mark of the variation scale 24, whereupon the magnetic bearing of the station is indicated by the reading of pointer 14 on scale 23. Also, the reverse bearing, or the magnetic bearing of the craft from the station is indicated directly by the reading of the tail portion 14' of pointer 14 on scale 23. Thus, with pointer 14 positioned as shown in Fig. 1 of the drawings, the position of the transmitting station with respect to the craft's heading or fore and aft axis is 45°. Also, assuming scale 23 has been set to correspond to the ship's compass course, then this course is indicated as 0° or magnetic north, in which case the bearing of the station from the craft is 45° magnetic and the bearing of the craft from the station is read as 225° magnetic under the tail portion 14' of pointer 14. If it is desired to convert these readings to bearings relative to the true north, it is merely necessary to turn knob 22 so that the craft's magnetic course indication on scale 23 is turned from the zero position of variation scale 24 to the point thereof corresponding to the compass variation of the locality in which the craft is located. Thus, assuming that the variation is 10° east, then in Fig. 1 the zero of scale 23 is moved so as to be aligned with the 10° east point of variation scale 24, whereupon true bearings are indicated by pointer 14 on scale 23. In the example given in Fig. 1, these true bearings will be 55° for the bearing of the station from the craft or 235° for the bearing of the craft from the station, this latter true bearing being suitable for application direct to a chart as in plotting position.

If it is desired to manually fly a homing course to a transmitting station, the selector switch knob 12 is turned to the "homing" position and the pointer setting switch knob 26 is turned right or left, as the case may be, thus controlling drive motor 3 so that the motor turns loop 2 and pointer 14 to bring this pointer to zero position on scale 15, whereby the plane of the loop extends at right angles to the fore and aft axis of the craft. The connections are now such that the directional signals from the receiver 8 are fed to a right-left indicator meter 27. By observing this meter and piloting the craft accordingly, a homing course can be flown to the transmitting station tuned in on one of the scales 19, 20, 21. The volume control knob is designated 33 and is on panel 11.

Should there be a side wind and the pilot desire to fly a straight course to the station, he can fly a "crabbing" or angle course to offset the effect of the cross or side wind by operating switch 26 to turn loop 1 off to one side or the other, thereby setting in the desired wind correction. In setting the loop direction, the pilot selects the heading or loop angle which results in a directional gyroscope course that is constant.

If it is desired to automatically fly a homing course to a transmitting station, the selector switch knob 12 is set in position marked "Gyro pilot," in which position, with pointer 14 in zero position on scale 15, the directional signals from receiver 8 are fed through leads in a cable 16 to an electro-pneumatic valve 29 that is connected for controlling the base line of the azimuth or directional gyroscope 30 of the automatic pilot 31. By turning pointer 14 from zero position, correction for side wind can be made as in manually flying a homing course.

In the copending application of Bert G. Carlson, Serial No. 32,193, filed July 19, 1935, there is disclosed means for controlling the operation of an automatic or gyro pilot from a right-left radio compass, the novel compass of this invention being adapted for performing the functions of the radio right-left indicator of that application.

Selector switch knob 12 may also be positioned on the "shielded loop" indication, in which position the pointer setting switch knob 26 may be turned to control motor 3 so as to cause loop 2 to be rotated to the position of maximum signal while the non-directional antenna 9 is disconnected. While in this position, the input to receiver 8 is shielded from electrostatic induction so that only electromagnetic waves affect the receiver, thereby eliminating most of the undesired effects of rains, sleet and snow, as is known to those skilled in the art.

Referring now to Fig. 2, wherein a wiring diagram of the structure of Fig. 1 is given, the loop 2 for receiving the directional signals is shown as a divided or center tapped loop with its center tap grounded at 2'. Loop 2 is tuned by a condenser 32 connected across leads 5, 6 and operated from the tuning knob 18. The output of loop 2 is fed through leads 5, 6 and blades 34, 35 of relay 36 through the double rectifier tube 37 and through resistor 47 to ground 50. From tube 37 the directional R. F. signal voltage is applied through lead 38, relay blade 39 and lead 40 to the control grid of an amplifier tube 41 along with the non-directional R. F. signal from the antenna 9, this latter signal passing through lead 10 and blade 42 to lead 40.

An oscillator tube circuit 43 is energized from D. C. supply leads 54, 54' through connecting leads 55, 55' and supplies a low frequency alternating current, of large amplitude compared to the radio signals received on the loop, through transformer 44 and similar windings 45, 46 through R. F. chokes 49, 49' to the plates of double rectifier tube 37. This low frequency A. C. acts as an alternating bias so as to cause the signal from the divided loop 2 to be alternately reversed in phase while being added to the output of the non-directional antenna 9, whereby the voltage drop across the resistor 47 in the common plate-cathode circuit of tube 37 is caused to contain three principal components when the loop 2 is in position to receive energy from a transmitting station.

These three components are, firstly, a R. F. voltage supplied from loop 2 through tube 37 proportional to the strength of the received signal and to the angular position of loop 2 in the R. F. field; secondly, a voltage supplied from non-directional antenna 9 proportional to the received signal, and thirdly, a low frequency alternating voltage from oscillator 43 dependent in magnitude on the R. F. unbalance at the plates of tube 37. Rectifier 37 thus serves as an electronic switch and as a balanced modulator, so that a modulated R. F. signal is fed to the grid of tube 41 whenever loop 2 is turned in the R. F. field to a receiving position.

The sign of the modulation is reversed, i. e., the peak of the modulation envelope is shifted 180° as divided loop 2 is turned to right or left from its null position with respect to the incoming signal by virtue of the addition of the non-directional R. F. voltage in the rectifier plate circuit across resistor 47. The modulation envelope is fed through the untuned R. F. amplifier stage 41 to the amplifier and detector 48 of any suitable type. By detector action, the low frequency modulation is obtained and brought out on leads 51 and supplied to a transformer 52 from which it is fed in push-pull to the grids of triode tubes 53, 53'.

The plates of tubes 53, 53' are connected to the contact arms 12' and 12" of selector switch 12. With this switch in the "compass" position shown in Fig. 1, corresponding to the "A" position in Fig. 2, the plate circuits of these tubes contain operating coils 57' and 58' of reversing relays 57 and 58. Plates of tubes 53, 53' and coils 57', 58' are fed with A. C. from oscillator 43 through transformer 44, lead 59 and leads 60 and 60'. This circuit functions as a selective device to operate one or the other of the relays 57 or 58, depending upon the direction in which the loop 2 is turned with respect to its null position, i. e., upon the phase of the audio output of transformer 52.

The contacts of relays 57, 58 are in circuit with the armature of the radio loop operating D. C. motor 3. The field winding 65 of motor 3 is permanently connected across leads 61 and 62. Operation of one of the relays 57 or 58 connects the armature of motor 3 in one direction across the D. C. supply leads 61, 62, whereas operation of the other of these relays reverses the connection of this armature across leads 61, 62, hence reversing the direction of operation of the motor 3. Thus, with coil 57' of relay 57 energized, current from lead 61 passes through current limiting resistance 63, the outer and center contacts of relay 57, lead 64 downwardly through the armature of motor 3, and the center and inner contacts of relay 58 to lead 62; whereas with coil 58' of relay 58 energized, current from lead 61 passes through resistance 63, the outer and center contacts of relay 58, lead 64 up through the armature of motor 3, and the center and inner contacts of relay 57 to lead 62. Thus, motor 3 serves to turn loop 2 to maintain the same in its null position with respect to the received signal and also simultaneously positions the pointer 14 with respect to compass scale 15. Condensers 66 and 66', connected in shunt with coils 57' and 58', serve to filter the rectified A. C. in the relay coils to give approximately equivalent D. C. operation. Inasmuch as the plates of tubes 53, 53' are energized from the same low frequency source as that supplying the modulating frequency to double rectifier 37, namely oscillator 43, these tubes will detect any reversal in phase of the audio signal output of amplifier-detector 48 due to shift of loop 2 from null position thereby serving to drive motor 3 in the proper and shortest direction to cause indicator 14 to always correctly indicate the bearing of the transmitting station. The system is thus free of 180° ambiguity present in systems requiring mental interpretation of a right-left or other indicator, the reading of which is the same for 0 and 180° bearings.

In order to prevent overrunning and hunting of motor 3, the back E. M. F. across the armature of this motor, which is dependent among other things upon the motor speed, is conveyed through lead 64 and resistors 68 and 68' to the grid bias circuit of tubes 53 and 53' through dividing resistors 69, 69'. Thus, the voltage cross the armature of motor 3 acts on tubes 53, 53' in a direction to cut the plate current of the driving tube 53 or 53', as the case may be, to zero before the loop is fully restored to null position, whereby motor 3 is brought to rest in a dead beat manner and without overshooting. This method of preventing hunting is disclosed in my copending application joint with Eric J. Isbister, Serial No. 83,844, filed June 6, 1936.

In operation, any misalignment of the loop 2 with respect to the incoming signal direction causes a modulated R. F. signal to be fed from rectifier-modulator 37 to the grid of amplifier tube 41, the sign of such modulation depending upon whether the loop is turned to the right or left of its null position. The amplified low-frequency modulated R. F. envelope enters the amplifier-detector 48, from which it issues as low frequency to select either relay 57 or 58 and cause motor 3 to run and drive loop 2 to its null position, thus cutting off the input modulation envelope and reducing the output low frequency as this null is reached. The speed or back E. M. F. voltage from the motor armature, by being introduced into the relay grid circuit in a direction to cut off the relay actuating tube 53 or 53', and increase the plate current in the non-operating tube, serves to return the relays to normal position before the system reaches a balance, thereby avoiding overshooting and hunting.

When selector switch knob 12 is turned to the "homing" or "B" position in order to manually fly a homing course to a transmitting station, the selector switch arms 12' and 12" are connected to the respective terminals of the right-left or zero center meter 27, the supply for the plates of tubes 53 and 53' being from transformer 44, lead 59 and lead 70 through resistors 71 and 71'. A condenser 72 is connected across the terminals of meter 27 to steady the pointer thereof. The pointer setting switch knob 26 serves to operate motor 3 so as to turn loop 2 and bring pointer 14 to zero (or fore and aft) position on scale 15. Thus, when knob 26 is turned clockwise, its blade 73 completes a circuit from lead 61, lead 74, blade 73, lead 75, auxiliary relay coil 76' and lead 77 to negative lead 62. Coil 76' serves to operate the contacts of relay 58 and cause motor 3 to run in one direction, whereas when knob 26 is turned counter-clockwise, the auxiliary relay coil 76 is similarly energized to operate relay 57 and turn motor 3 in the reverse direction. With pointer 14 on zero, the right-left indications of meter 27 enable the pilot to fly a homing course to the station, and by correcting for side wind, as heretofore explained, he can fly a straight course to the station.

When the selector switch knob 12 is turned to "gyro pilot" or "C" position, the switch arms 12', 12" connect the plates of tubes 53, 53' to the outer ends of solenoids 77, 77' of electropneumatic valve 29 by leads 78, 78, a common return lead 79 being connected to lead 59. Solenoids 77, 77' serve to operate an armature 80 and hence a connected balanced piston valve 81 in opposite directions, depending on the direction in which the loop 2 is turned from its null position with respect to the incoming wave, whereby this valve controls the flow of air from inlet pipe 82 to pipes 83, 83' leading to oppositely acting turbine wheels 84 fixed on shaft 85.

Shaft 85 is connected through reduction gearing 86 and differential gearing 87 to turn the air port carrying member 88 of the automatic pilot directional gyro with respect to the cut-off plate 89 in the manner disclosed in the previously mentioned Carlson application #32,193. This shifting of the base line of the directional gyroscope causes the same to effect operation of the rudder servo motor 90 (see Fig. 1) to thereby actuate rudder 91 to automatically fly or steer the craft to the transmitting station, the pointer 14 having been set by means of knob 26 on zero position of scale 15. A follow back connection from the servo motor or rudder to the air port carrying member 88 is provided by cable 92 passing around drum 93 operating the arm of differential gearing 87.

When the selector switch knob 12 is turned to the "shielded loop" or "D" position, the plates of tubes 53, 53' are connected in parallel and the standby current through these tubes serves to actuate the relay 36. Current for this relay is supplied from oscillator 43 through transformer 44, lead 59, lead 94, the operating coil of relay 36, lead 95 and switch arms 12', 12" to the plates of tubes 53, 53'. The operation of relay 36 throws blades 42, 39, 34 and 35 to their upper contacts, in which position the rectifier-modulator 37 and non-directional antenna 9 are disconnected from lead 40, while the loop 2 is connected through blades 34, 35, transformer 96, blade 39 and lead 40 and amplifier 41 to the amplifier and detector 48 having the listening earphones 97 connected to the output thereof. Now by adjusting loop and pointer setting knob 26, the operator can turn the shielded loop 2 to the position of maximum received signal as indicated by the earphones 97, in which position, the undesired effects of static produced by rains, sleet and snow, etc. are greatly reduced due to the elimination of electrostatic signals, thereby greatly facilitating ordinary aural reception.

The arrangement of Fig. 3 is similar to that of Fig. 2 with the exception that a somewhat different form of motor control circuit is illustrated. In this figure the loop 2 and non-directional antenna 9 are connected to the loop switching circuits 98 similar to that shown in Fig. 2, the amplifier and detector 99 being supplied from such circuits, the low frequency modulation output of the amplifier and detector 99 being fed to a transformer 100 similar to transformer 52 of Fig. 2. Transformer 100 supplies this low frequency modulation in push-pull or 180° out of phase relation to the grids of a double triode 101 acting as amplifier and phase detector in that it detects the phase of the loop output, i. e. whether the loop is being turned to the right or left of its null position.

The output of tube 101 is connected through condensers 102, 102' to the grids of a double grid controlled rectifier tube 103, so that the low frequency modulation corresponding in magnitude and phase to the angular displacement and direction of turning of the loop 2, is supplied to one of the grids of tube 103, thereby causing this tube to be operated by graduated phase shift control as is known to those skilled in the art and as explained in articles by Albert W. Hull in the General Electric Review, Vol. 32, Nos. 4 and 7, April and July, 1929. Tube 101 also serves as a rectifier in that it draws current from supply transformer 104 through the impedance consisting of choke coil 105 and resistors 106, 106', the current dividing at the mid tap of choke 105 to flow partly up through resistor 106 and the remainder down through resistor 106'. The flow of this current produces an unbalanced D. C. component in choke 105 and in resistors 106, 106' in the manner described in detail in my co-pending application Serial No. 11,424 joint with William T. Cooke, filed March 16, 1935, whereby as this D. C. component varies, a voltage is induced across choke 105, which voltage is in phase with the time rate of change of loop displacement, i. e., velocity, the first derivative of displacement with respect to time.

Thus, if an angular displacement of the loop occurs with respect to its null position, two D. C. voltages appear at the outer ends of resistors 106, 106', one proportional to and in phase with the angular displacement of the loop and the other proportional to and in phase with the velocity thereof. The combination of these voltages is applied to condensers 102, 102', and if these voltages are changing, the derivatives thereof with respect to time are passed onto the grids of tube 103 in 180° out of phase relation, i. e., D. C. surge voltages corresponding to the first and second derivatives of loop displacement with respect to time are supplied to tube 103. The plates of tube 103 are supplied from transformer 104 through corresponding windings of motor control transformers 107, 108. The remaining windings of the motor control transformers are respectively connected at their outer ends to the outer ends of reversing field windings 109 and 109' of induction motor 3' corresponding to motor 3 of Figs. 1 and 2.

The inner ends of said remaining windings of transformers 107 and 108 and the inner ends of field windings 109, 109' are connected to opposite ends of a secondary of supply transformer 104. When the upper plate circuit of tube 103 is rendered conducting, the field winding 109 is energized to drive motor 3' in one direction, and when the lower plate circuit of tube 103 is rendered conducting, the field winding 109' is energized to drive the motor 3' in the opposite direction, thereby turning loop 2 and pointer 14, as desired. Inasmuch as rates are employed in controlling motor 3', the loop 2 is maintained in its null position at all times with substantially no lag or hunting.

The arrangement of Fig. 3 is also adapted to be used for "homing," "gyro pilot" or "shielded loop" control just as in the case of Fig. 2, the selector switch 12 being adapted to be inserted in the plate circuits of tube 101 just as in the case of tubes 53, 53' of Fig. 2.

In the form of the invention shown in Fig. 4, another somewhat different form of motor control circuit is illustrated. In this figure, the loop 2 and non-directional antenna 9 are connected to the loop switching circuits 110 similar to that shown in Fig. 2, the amplifier and detector 111 being supplied from such circuits, the variable magnitude, reversible phase audio signal output of the amplifier-detector 111 being fed to a transformer 112. This signal is amplified by tube 113 and passed through transformer 114 to push-pull stage 115, where it is further amplified to a value sufficient for operation of one field winding 116 of a two-phase motor 3'' driving loop 2. This motor is thus driven in one direction or the other as the audio signal at transformer 112 is reversed by a change in the position of the loop antenna.

Overshooting of the synchronous or null loop position is prevented by the operation of a field distorting generator or dynamic transformer 117 in the manner disclosed in the copending application of Alger S. Riggs, now Patent #2,115,086, dated April 26, 1938. Generator 117 is driven by motor 3'', having one field 118 energized from supply leads 119 and its other field 120 connected to transformer 112 in the direction to oppose or buck the audio signal voltage. This opposing voltage of generator 117 varies with the speed of motor 3'', so that as the system approaches a balanced position and the audio signal falls toward zero, such signal is overcome by the speed voltage produced by generator 117, whereby field 118 of motor 3'' is reversed and the system quickly braked to a stop. By suitable adjustment this system can be made dead-beat and non-hunting.

A switch 121 is included between the output transformer 122 of push-pull stage 115 and motor field winding 116 so as to enable setting the loop 2 to any desired angular position, as when flying a homing course. When switch 121 is thrown so that contacts E, E' thereof are connected to winding 116, this winding is connected by leads 123 across A. C. supply leads 119 so as to drive motor 3'' in a clockwise direction, for example. When the loop 2 has reached the desired position, the switch 121 is released and returned by spring action so that terminals F, F' are connected to winding 116. Similarly, when switch 121 is moved so that contacts G, G' are connected to winding 116, the motor 3'' runs in the reverse or counter-clockwise direction. Switch 124 serves for connecting the left-right or zero center meter 27 to the system, whereby the device may be used as a homing compass.

The power supply for the entire system of Fig. 4 is shown as furnished by the double-current generator 125. This generator is driven by a motor 126 which may be operated from any suitable power source as leads 127. The output of the generator is shown consisting of a high voltage D. C. supplied to leads 128 for furnishing the plate voltage supply to the various radio and amplifier stages, and a low frequency A. C. voltage supplied to leads 129 for use in controlling the loop switching circuits and the follow-up motor 3''.

A switch 130 is provided in conjunction with switch 124 for feeding the reversing A. C. output of amplifier stage 115 to the reversing field winding 131 of a valve motor 132. Motor 132 is connected for turning the cut-off disc or plate 133 controlling the admission of air to ports 134, 134' leading through pipes 135, 135' to the oppositely acting turbine wheels 136, 136' similar to turbine wheels 84 of Fig. 2. As in Fig. 2, turbine wheels 136, 136' form a part of the automatic pilot 31 in Fig. 1 and control the azimuth or directional base line of the latter by turning ports 88 with respect to the directional gyro cut-off plate 89, thereby serving to automatically steer the craft on a homing course toward any desired station.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In radio compass apparatus for navigable craft, a non-directional antenna, a directional antenna in the form of a center-tapped loop, means for positioning said directional antenna with respect to the direction of reception of a radio wave from a remote transmitter including, a reversible motor, a circuit receiving the output of said two antennae, a source of low frequency A. C. connected thereto, electron switching means controlled by said low frequency A. C. for alternately connecting the two halves of said loop to said circuit, an amplifier-detector receiving the output of said circuit and biased by said low frequency A. C. for obtaining a signal reversing in phase as said loop passes through its null position and which varies at said low frequency, means for obtaining a reversible polarity D. C. signal proportional thereto, means for obtaining D. C. signals proportional to the first and second order time derivatives of said first D. C. signal and means for utilizing said reversible phase low frequency signal and said derivative signals jointly to control the operation of said reversible motor.

2. In a radio compass apparatus for navigable craft, directional and non-directional antennae, a low frequency alternating current supply, rectifier means connected to said supply and one of said antennae for serving as an electronic switch and balanced modulator for producing a modulated radio frequency signal, amplifying and detecting means for receiving said radio frequency signal and for producing a variable magnitude, reversible phase audio signal output therefrom, amplifying and phase detector means for receiving said audio signal and for detecting the phase of the directional antenna output, and compass operating reversible anti-hunting motive means controlled from said amplifying and phase detecting means.

3. In a radio compass apparatus for navigable craft, directional and non-directional antennae, a low frequency alternating current supply, rectifier means connected to said supply and one of said antennae for serving as an electronic switch and balanced modulator for producing a modulated radio frequency signal, amplifying and detecting means for receiving said radio frequency signal and for producing a variable magntiude, reversible phase audio frequency signal output, a compass indicator, anti-hunting motive means for orienting said directional antenna and said compass indicator, and phase detector means for receiving said audio frequency signal and for detecting the phase of the directional antenna output, said phase detector means being connected for controlling said motive means and being energized from said alternating current supply for preventing 180 degree ambiguity of said directional antenna.

4. In a radio compass apparatus for navigable craft, directional and non-directional antennae, a low frequency alternating current supply, rectifier means connected to said supply and said antennae for serving as an electronic switch and balanced modulator for producing a modulated radio frequency signal, amplifying and detecting means for receiving said radio frequency signal and for producing a variable magnitude, reversible phase audio signal output therefrom, amplifying and phase detector means for receiving said audio signal and for detecting the phase of the directional antenna output, compass operating reversible motive means controlled from said amplifying and phase detecting means, and feed back means responsive to the operation of said motor connected to the input of said amplifying and phase detecting means for opposing the audio signal input thereto to eliminate overrunning and hunting of said motive means.

5. In radio compass apparatus for navigable craft, directional and non-directional antennae carried by the craft for receiving signals from a transmitting station, a control circuit fed from said antennae and responsive to the displacement of said directional antennae from null position with respect to said signals and to a time derivative thereof, motive means operated by said control circuit for automatically turning said directional antenna, and a compass indicator operated from said motive means.

6. In a radio compass, the method of orientating an indicator which comprises receiving radio frequency signals from a source whose direction is to be indicated, deriving from said signals a carrier frequency signal, generating modulation currents, applying said modulation currents to said carrier, amplifying said modulated carrier currents, detecting said amplified modulated carrier to derive a current of modulation frequency which reverses in phase as a function of the bearing of said source, combining said last named reversible phase current with said modulation current and using said combined currents to control reversible motive means effecting the orientation of said indicator, and further controlling said reversible motive means in accordance with its own velocity to prevent hunting of said indicator about its position of rest.

7. In a radio compass apparatus for navigable craft including a directive and a non-directive antenna and motive means for orientating said non-directive antenna, the method of orientating an indicator to indicate the angular relationship of a wave front and said directive antenna which comprises deriving a carrier frequency current from said non-directive antenna, deriving a second carrier frequency current from said directive antenna which varies in amplitude and reverses in phase as a function of said angular relationship, generating currents of modulation frequency, applying said modulation currents to said second carrier current, deriving modulated radio frequency currents from said modulated carrier, combining said first carrier and said modulated radio frequency currents, detecting said combined currents to derive therefrom an audio frequency current, combining said audio frequency current with said modulation current, obtaining the rate of change of the effective value of said combined current and jointly utilizing said combined current and its rate of change to control said motive means in a dead beat manner and hence the orientation of said directive antenna and said indicator as a function of the angular relationship between said directive antenna and said wave front.

8. In a radio compass apparatus, a directional antenna, a reversible motor for orienting said directional antenna, a supply of low frequency alternating current, means for modulating the output of said directional antenna with said low frequency alternating current, a non-directional antenna, amplifier means connected for receiving and amplifying the modulated output of said directional antenna and the output of said non-directional antenna, detector means connected for demodulating the output of said amplifier, a control circuit for said reversible motor connected to be supplied from said detector means, said control circuit also being connected to said low frequency alternating current supply, whereby a comparison of the relative phases of the low frequency output of said detector means and said alternating curernt supply is effected for the purpose of controlling the operation of said motor to maintain said directional antenna in substantially a null position with respect to received electromagnetic waves, and further means for controlling the operation of said motor in accordance with its own speed of rotation to prevent hunting.

9. In a radio compass apparatus, a directional antenna, a reversible motor for orienting said directional antenna, a supply of low frequency alternating current, means for modulating the output of said directional antenna with said low frequency alternating current, a non-directional antenna, amplifier means connected for receiving and amplifying the modulated output of said directional antenna and the output of said non-directional antenna, detector means connected for demodulating the output of said amplifier, and a control circuit for said reversible motor connected to be supplied from said detector means, said control circuit also being connected to said low frequency alternating current supply and including means for comparing the phase of the low frequency output of said detector means with that of said alternating current supply, a relative shift of said phases corresponding to movement of said directional antenna from null position with respect to received electromagnetic waves, being utilized by said control circuit to drive said directional antenna back into null position, said control circuit including means for applying to said motor a voltage proportional to the speed at which said directional antenna is driven, said last voltage being applied in a sense to prevent said directional antenna from hunting about its position of rest.

10. Radio compass apparatus as claimed in claim 8 in which the means for controlling the motor in accordance with its own speed of rotation includes a generator driven by said motor.

11. Radio compass apparatus as claimed in claim 8 in which the means for controlling the operation of the motor in accordance with its own speed of rotation includes means for utilizing the armature voltage of said motor.

12. Radio compass apparatus for dirigible craft comprising a directional antenna, a non-directional antenna, a source of low frequency A. C., modulating and combining means for obtaining from the radio frequency signals received by said two antannae and said low frequency A. C. a reversible phase signal proportional to the angle between said directional antenna and the wave front of a wave radiated by a remote transmitter, power operated means for orienting said directional antenna to a position of minimum reception, a control for said power operated means, manually controlled means for operating said directional antenna to a position of minimum reception, means for indicating the sense and magnitude of the deviation of said directional antenna from said position of minimum reception, means for controlling the course of the craft in accordance with a reversible electrical signal, switching means for selectively applying said reversible phase antenna-derived signal to the control for said power operated antenna orienting means, to said indicating means, and to said course controlling means.

13. In a radio compass apparatus for navigable craft, a turnable directional antenna, motive means for orienting said antenna, circuit means fed from said antenna for deriving a control signal indicative of the direction of propagation of received radio waves emanating from a remote transmitter, means for continuously and instantly controlling said motive means in response to said control signal and a time derivative thereof, a compass pointer connected to turn with said antenna, a fixed scale and a concentric relatively movable compass scale, both said scales cooperating with said pointer, and means for setting said relatively movable compass scale so that the same may conform with the craft's compass reading, said compass pointer cooperating with said fixed scale to indicate the direction of the transmitter with respect to the craft's heading and cooperating with said movable scale to indicate the compass bearing of the remote transmitter as well as the reverse bearing thereof.

14. In a radio compass apparatus for navigable craft, a turnable directional antenna, motive means for orienting said antenna to the null position with respect to a remote transmitter, a compass pointer connected to turn with said antenna, circuit means fed from said antenna for deriving a control signal indicative of the direction of propagation of received radio waves emanating from the remote transmitter, means for continuously and instantly controlling said motive means in response to said control signal and a time derivative thereof, a fixed scale and a concentric relatively movable compass scale, both said scales cooperating with said pointer, means for setting said relatively movable compass scale so that the same may conform with the craft's compass reading, said compass pointer cooperating with said fixed scale to indicate the direction of the transmitter with respect to the craft's heading and cooperating with said movable scale to indicate the compass bearing of the remote transmitter as well as the reverse bearing thereof, and a magnetic variation scale arranged concentric with said other scales, whereby the setting of said movable scale with respect to said variation scale may be employed to correct for the magnetic variation at the position of the craft, thereby showing on the movable scale true direct and reverse bearings of said transmitter.

15. In radio compass apparatus for navigable craft, directional and non-directional antennae carried by the craft for receiving signals from a transmitting station, a control circuit fed from said antennae and responsive to the displacement of said directional antenna from null position with respect to the wave front of said signals, motive means operated by said control circuit, antihunt means connected to said control circuit and operating in response to the speed of said motive means for providing a corrective signal aiding in the control of said motive means for causing the latter to automatically turn said directional antenna in a dead-beat manner.

16. In radio compass apparatus for navigable craft, a non-directional antenna, a directional antenna in the form of a center-tapped loop, means for positioning said directional antenna with respect to the direction of reception of a radio wave from a remote transmitter including, a reversible motor having a motor winding, a circuit receiving the output of said two antennae, a source of low frequency A. C. connected thereto, electron switching means controlled by said low frequency A. C. for alternately connecting the two halves of said loop to said circuit, an amplifier-detector receiving the output of said circuit and biased by said low frequency A. C., for obtaining a signal reversing in phase as said loop passes through its null position and which varies at said low frequency, grid controlled rectifier means electrically coupled to said motor winding, and means employing said reversible phase and variable signal for controlling said grid controlled rectifier means to produce a graduated control of the output of said grid controlled rectifier means to effect continuous and instant response of the motor to the direction of propagation of the received radio waves.

FRANCIS L. MOSELEY.